United States Patent
Darrah et al.

[15] 3,680,129
[45] July 25, 1972

[54] AIRCRAFT TOWED INFLATABLE ANTENNA

[72] Inventors: John H. Darrah, Albuquerque, N. Mex.; James C. Bell, Uniontown, Ohio; Jerome J. Vorachek, Barberton, Ohio; John W. Bezbatchenko, Akron, Ohio; George A. Biecker, Akron, Ohio; James A. Barton, Uniontown, Ohio; Robert C. Gordon, Cuyahoga Falls, Ohio; Gerald D. Kirschner, Akron, Ohio

[73] Assignee: The United States of America as represented by the Secretary of Air Force

[22] Filed: April 29, 1971

[21] Appl. No.: 138,424

[52] U.S. Cl. ........................343/706, 343/896, 343/908
[51] Int. Cl. ........................................H01q 1/28
[58] Field of Search..................343/705, 706, 708, 752, 802, 343/896, 908

[56] References Cited

UNITED STATES PATENTS 2,756,948   7/1956   Winzen et al. ..................343/706

Primary Examiner—Eli Lieberman
Attorney—Harry A. Herbert, Jr. and Willard R. Matthews, Jr.

[57] ABSTRACT

The invention comprehends a towed airborne electromagnetic radiating pulse antenna simulator. The antenna simulates the rf energy spectrum of radiation emitted from a nuclear detonation. It consists of a helium inflated centerbody to which are appended two trailing wire cages, the whole of which is towed by either an aircraft or helicopter. The inflated semi-rigid centerbody has extended lengths of wire cages which extend the effective antenna length. Electrical performance is enhanced by means of continuous resistive surfaces and lumped resistance elements located between cage segments.

6 Claims, 4 Drawing Figures

INVENTORS.
JOHN H. DARRAH
JAMES C. BELL
JEROME J. VORACHEK
JOHN W. BEZBATCHENKO
GEORGE A. BIECKER
JAMES A. BARTON
ROBERT C. GORDON
GERALD D. KIRSCHNER

BY Harry A. Herbert Jr
and
Willard R. Matthews
ATTORNEYS

AIRCRAFT TOWED INFLATABLE ANTENNA

BACKGROUND OF THE INVENTION

This invention relates to electromagnetic wave radiating experimental devices and more particularly to large air-borne towed antennas capable of radiating over a wide frequency spectrum including very low frequency long wavelength radiation.

There are various problems to be overcome in order to achieve operable antennas of this type. The large radiating element together with its self contained electromagnetic wave generating equipment presents a serious weight lifting problem to the towing aircraft. Such an antenna must remain relatively straight over a range of swing back angles in order to provide controllable and predictable electrical performance. Aerodynamic effects on the long flexible antenna structure make this difficult to accomplish. Further complicating this problem is the requirement for complete variation of polarization incident angles on a target in both the azimuth and elevation modes. Large dimension lengths and diameters are required in order to maximize low frequency content in the radiated pulse. Electrically, it is also desirable to eliminate end reflections. The present invention is directed toward resolving the foregoing mutually incompatable design criteria and toward solving the specific problem enumerated and others prevalent in current state of the art towable airborne antennas.

SUMMARY OF THE INVENTION

The invention comprises a towable airborne antenna having an inflatable centerbody with wire cage extensions appended to each end. Helium or other lighter-than-air gas is used to inflate the centerbody. The outer surface of the centerbody has a resistive coating making it together with the cage members and connecting lumped electrical resistance one long extended radiating member. The inflatable centerbody is provided with ballonets and with air compartments which can be used to manipulate the antenna into a desired trim mode for various swingback angles. The wire cage extensions comprise a plurality of segments that are connected to the centerbody and to each other by lumped resistors. Each cage comprises a plurality of straight conductor cable elements that are arranged to make a truncated conical structure. The circumferential spacing of the longitudinal cables is determined by minimizing the aerodynamic interference of one cable or another while maximizing the ratio of the cages electrical diameter to the cage physical diameter. A pulse generator is positioned within the centerbody and electrically connected to the outer surface to provide an electromagnetic wave generating source.

It is a principal object of the invention to provide a new and improved towable airborne antenna.

It is another object of the invention to provide a towable airbrone antenna that is inflated with lifting gas.

It is another object of the invention to provide a towable airborne antenna that can be kept substantially straight for a large range of swingback angles.

It is another object of the invention to provide a towable airborne antenna having large dimension lengths and diameter that can be towed by conventional aircraft.

It is another object of the invention to provide a towable airborne antenna having minimum end reflections.

These together with other objects, advantages and features of the invention will become more readily apparent from the following detailed description when taken in conjunction with the illustrative embodiment in the accompanying drawings.

DESCRIPTION OF PREFERRED EMBODIMENT

The invention consists of a helium inflated centerbody to which are appended trailing wire cages, the whole of which is towed by some auxiliary vehicle such as a helicopter or airship. It is designed with an inflated semi-rigid centerbody with the extended lengths of wire cages added to extend the effective antenna length and to provide low frequency components to the transient radiated pulse. The centerbody can be designed to provide sufficient helium volume to support and lift the pulse generator while still maintaining a payload factor within the capability range of the towing vehicle. The helium lift makes up the difference regardless of the pulser weight.

Figure 1:
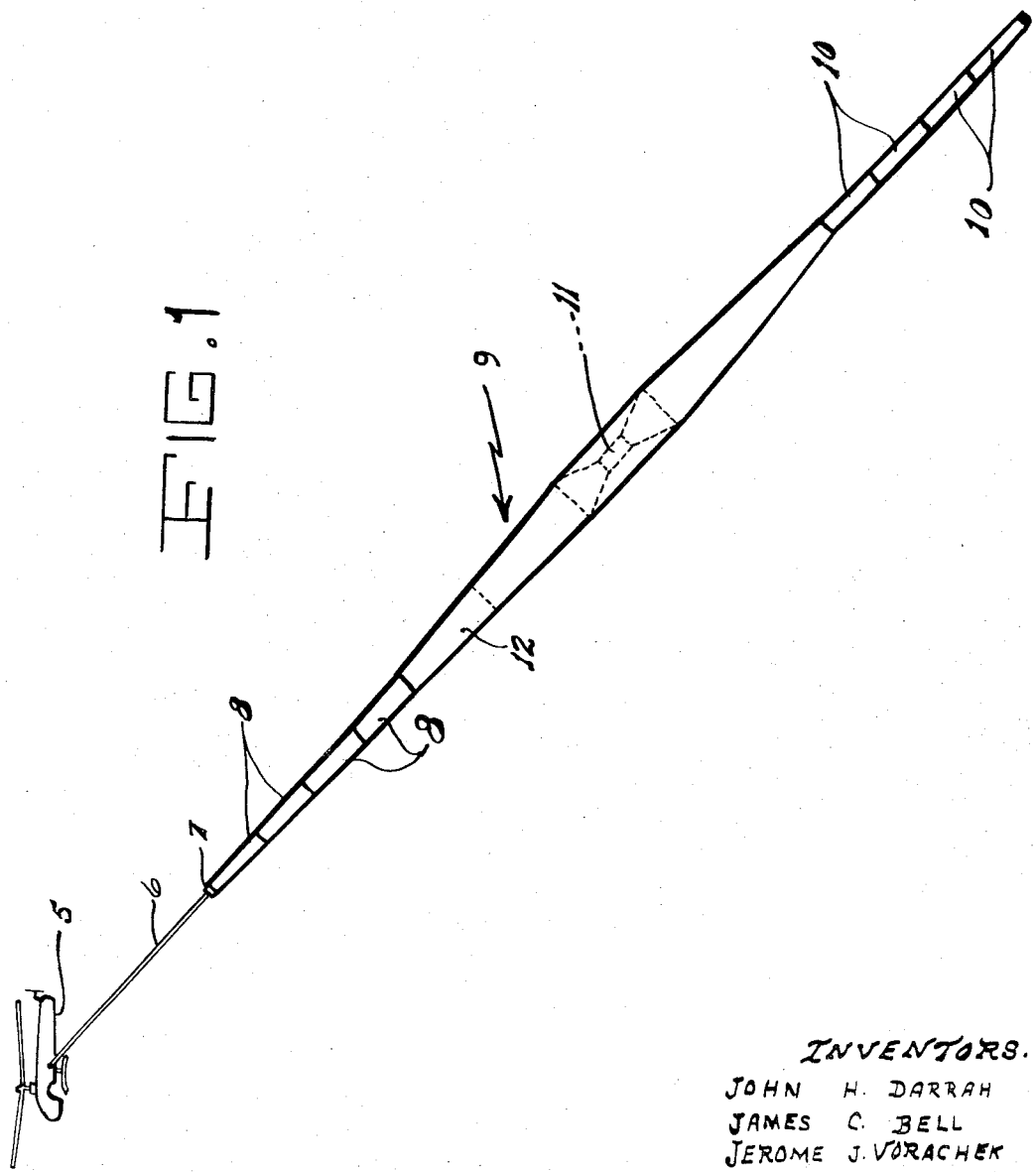
FIG. 1 is a pictorial illustration of the towable airborne antenna comprehended by the invention.

FIG. 1 illustrates such an arrangement. An aircraft such as helicopter 5 tows the antenna of the invention with tow rope 6 through swivel 7. The antenna itself comprises forward wire cage segment 8, inflatable centerbody 9 and rearward wire cage segments 10. The wire cage segments are electrically connected to each other and the the inflatable centerbody through lumped resistors (not shown). Centerbody 9 has its outer surface coated with resistive material. A pulse generator 11 is mounted within the centerbody 9 also and electrically connected to its surface. Centerbody 9 also has an air compartment 12 and ballonets (not shown) that permit manipulation of the antenna to achieve linearity at various swingback angles.

Straightness of the antenna is a critical factor for controlled predictable electrical performance and is maintained at various swingback angles by matching the drag to weight ratio of the centerbody and the antenna cage extensions. Trimming orientation of the inflatable centerbody at various swingback angles at a given tow speed is accomplished by balancing aerodynamic moments with the weight of air in compartment 12. Trimming of the centerbody can also be accomplished with fins. The ballonet system of the centerbody 9 is similar to those used in airships to compensate for altitude changes and to maintain pressure for structural integrity in the centerbody.

Figure 2:
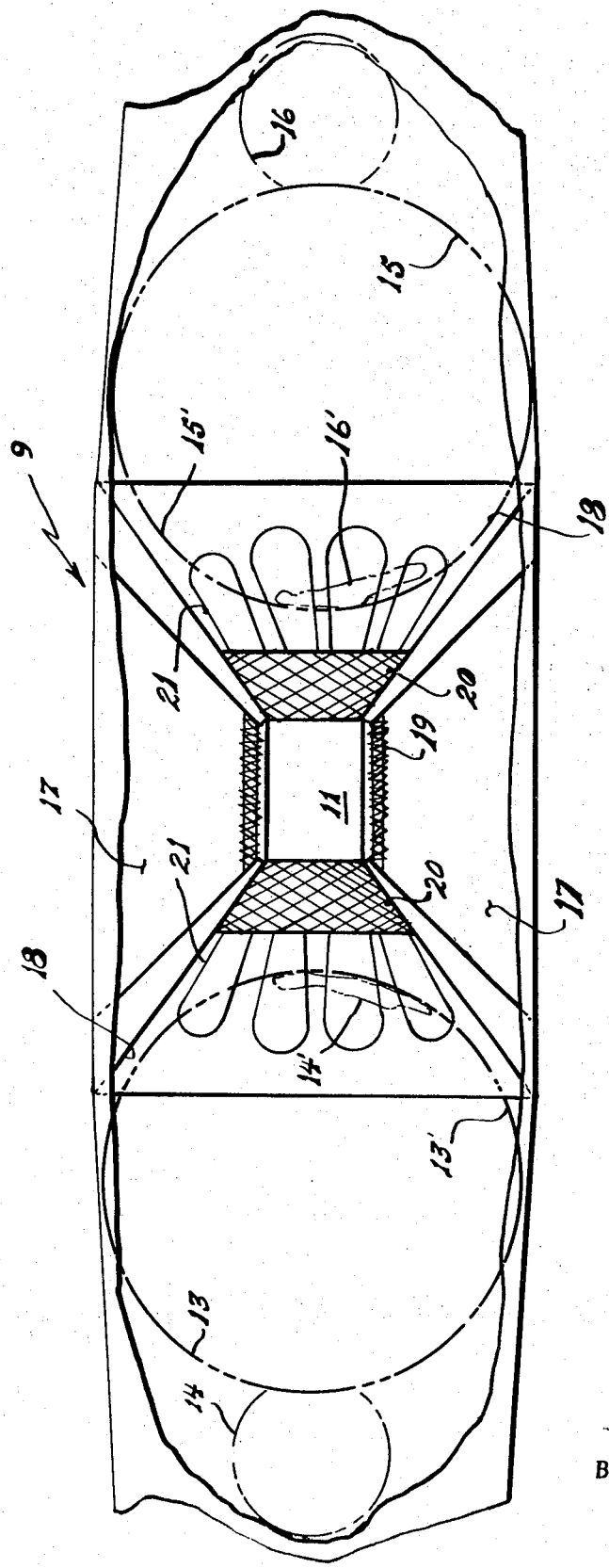
FIG. 2 is a cutaway detail view of the inflatable centerbody portion of the antenna of FIG. 1.
Figure 3:
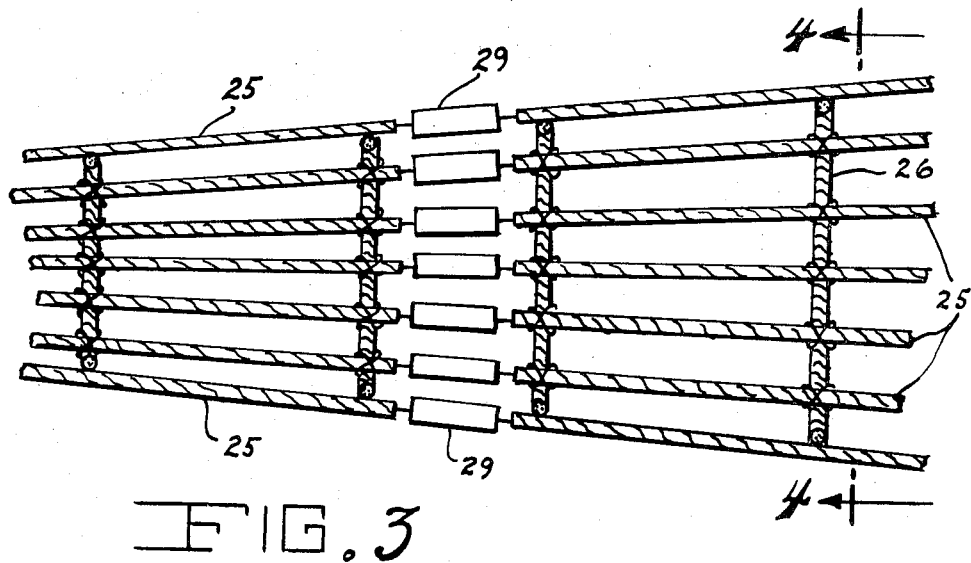
FIG. 3 is a sectional view of a cage extension segments of the antenna of FIG. 1; and, FIG. 4 is a sectional view of FIG. 3 taken at 4—4.
Figure 4:
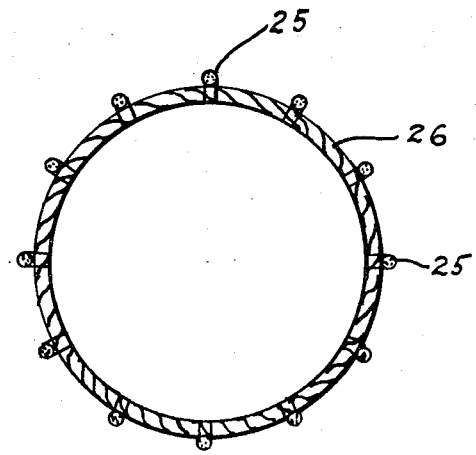

FIG. 2 is a cutaway detail of the centerbody 9 illustrating the ballonet system and means for mounting pulse generator 11. Centerbody 9, ballonet curtains 13 and 15, support webbings 17 and other structure are made of air-tight fabrics of the type conventionally used in airships and ballons and the like. Pulse generator 11 is horizontally mounted within the centerbody 9 by means of webbing 17 and lacing 19. It is longitudinally restrained by means of bicone catenary webb members 18 and wire ropes 21. Wire screen cones 20 are used as shown to electrically densify the catenary wire ropes 21. The centerbody 9 is provided with a forward ballonet curtain 13 and a rearward ballonet curtain 15. These ballonet curtains include auxilliary air bladders 14 and 16 respectively. Ballonet curtains 13 and 15 are shown in ground position. At altitude position these curtains are in the positions shown by 13' and 15'. Auxilliary air bladders 14 and 16 are shown in pressurizing positions. At altitude position they are collapsed as indicated by 14' and 16'.

The trailing wire cages 8 and 10 consist of truncated conical cage of wire and lumped resistors so designed as to appear continuous at long electrical wavelengths. The orientation (swingback angle) of the longitudinal axis of the entire antenna relative to the vertical is controlled by the speed of the towing vehicle, being zero degrees at hover and up to approximately 90° swingback angle.

It consists of longitudinal steel wire rope members (25) which are individually interrupted electrically at definite intervals by the insertion of a lumped resistor (29) which provides not only a defined electrical resistance to the current flow but also a dielectric mechanical connection for carry-thru of the tension loads. The peripheral spacing of the longitudinal cage members is maintained by mechanical connections at definite intervals to circumferential wire rope rings 26. Lumped resistors 29 consists of a mechanical dielectric pass-thru for the tension loads plus an electrical resistive pass-thru.

The wire cage is designed to fly at the same angle as the central body for a given tow speed by using a balanced force principle. The major element of a wire cage configuration is the longitudinal cables, which have a circumferential spacing d such that the aerodynamic interference of one cable on another is negligible thereby permitting each cable to be treated separately. The spacing d further has a maximum value set by electrical consideration. A cable under tow has a "critical angle" where a balance of aerodynamic forces and the weight produces a linear display of cable shape. As an example, the requirement of a critical angle of 45° is such that the running cable weight ($w$) to the normal running drag ($D$) must have a value $$w/D = 0.707$$

The antenna is comprised of these cables and additional minor structure so that the wire cage antenna extensions will tow straight at nearly the "critical angle" speed of a single cable. A uniform distribution of weight and drag is important to this linear achievement.

The longitudinal axis is maintained in a reasonably straight line for a range of centerbody "swingback" angles. As the tow speed changes the combined use of the inflatable centerbody and trailing wire cage appendages maintain a balanced flight condition so that the antenna remains relatively straight over a broad range of swingback angles.

The antenna can also be adapted to flight in greater swingback angles to nearly 90° which is the horizontal mode. This is accomplished by providing a nose-down moment by displacing helium to the rear, by employment of fluid ballast which is pumped to the nose or by the employment of movable horizontal tails.

While the invention has been described in its preferred embodiments, it is understood that the words which have been used are words of description rather than words of limitation and that changes within the purview of the appended claims may be made without depicting from the scope and spirit of the invention in its broader aspects.

We claim:

1. A towable airborne radiating antenna comprising:
an elongated inflatable centerbody, said centerbody being inflated with lighter-than-air gas and having an electrically resistive coating on the outer surface thereof,
a pulse generator disposed therein, and
an antenna extension member connected to each end of said centerbody, each said extension member comprising a plurality of antenna segments serially arranged and interconnected by lumped electrical resistances,
said centerbody, said antenna segments and said lump resistances being serially connected in end to end relationships to effect a substantially linear electrically continuous radiating element, said pulse generator having its output connected thereto.

2. A towable airborne radiating antenna as defined in claim 1 wherein said centerbody is inflated with helium.

3. A towable airborne radiating antenna as defined in claim 2 wherein said centerbody includes ballonets.

4. A towable airborne radiating antenna as defined in claim 3 wherein said centerbody includes a trimming air bladder.

5. A towable airborne radiating antenna as defined in claim 4 wherein each said antenna segment comprises a truncated conical cage of electrically conductive wire ropes.

6. A towable airborne radiating antenna as defined in claim 5 wherein said electrically conductive wire ropes have circumferential spacings adapted to substantially eliminate aerodynamic interference of one wire rope on another.

* * * * *